(12) United States Patent
Chao et al.

(10) Patent No.: US 8,010,464 B2
(45) Date of Patent: Aug. 30, 2011

(54) COMPUTERIZED DATA EQUIDISTANT-MAPPING METHOD AND COMPUTER SYSTEM USING THE SAME

(75) Inventors: Shih-Pin Chao, Taipei (TW); Chien-Chun Kuo, Tainan County (TW); Chen-Lan Yen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 914 days.

(21) Appl. No.: 11/965,017

(22) Filed: Dec. 27, 2007

(65) Prior Publication Data

US 2009/0006281 A1 Jan. 1, 2009

(30) Foreign Application Priority Data

Jun. 26, 2007 (TW) .............................. 96123146 A

(51) Int. Cl.
G06F 15/16 (2006.01)
(52) U.S. Cl. ......................................................... 706/2
(58) Field of Classification Search ................. 706/2
See application file for complete search history.

(56) References Cited

U.S. PATENT DOCUMENTS

| 6,043,652 A | 3/2000 | Liu |
| 7,139,739 B2 | 11/2006 | Agrafiotis et al. |
| 2007/0121503 A1 * | 5/2007 | Guo et al. ..................... 370/230 |

OTHER PUBLICATIONS

'Curvilinear Distance Analysis versus Isomap': Lee, 2002, ESANN 2002 proceedings—European Symposium on Artificial Neural Networks Bruges (Belgium) Apr. 24-26, 2002 ISBN 2-930307-02-1 pp. 185-192.*

'A global Geometric Framework for Nonlinear Dimensionality Reduction': Tenenbaum, 2000, Science 290, pp. 2319-2323.*
'Isomap and Neural Networks Based Image Registration Scheme': Xu, 2006, Springer Verlag Berlin Heidelberg, ISNN 2006, LNCS 3972, pp. 486-491.*
'Neural ISOMAP': Chao, 2007, Third international conference on international information hiding and multimedia signal processing (IIH-MSP 2007) pp. 333-336.*

* cited by examiner

Primary Examiner — Omar F Fernandez Rivas
Assistant Examiner — Peter Coughlan
(74) Attorney, Agent, or Firm — Thomas|Kayden

(57) ABSTRACT

A computerized data equidistant-mapping method and a computer system using the same are provided. The computerized data equidistant-mapping method is used for mapping M sets of K-dimensional original data into a D-dimensional space in a manner of equidistance. The computerized data equidistant-mapping method includes the following steps. M sets of D-dimensional mapping data each corresponding to each original data respectively and sequentially are generated. An initial mapping data and an initial original data are chosen arbitrarily, wherein the initial mapping data corresponds to the initial original data. The mapping distance between each mapping data and the initial mapping data is computed. The original distance between each original data and the initial original data is computed. Each mapping data is amended according to each mapping distance and each original distance for enabling each mapping data and each original data to have equidistant-mapping relationship gradually.

14 Claims, 8 Drawing Sheets

COMPUTERIZED DATA EQUIDISTANT-MAPPING METHOD AND COMPUTER SYSTEM USING THE SAME

This application claims the benefit of Taiwan application Serial No. 96123146, filed Jun. 26, 2007, the subject matter of which is incorporated herein by reference.

BACKGROUND OF THE INVENTION

1. Field of the Invention

The invention relates in general to a computerized data equidistant-mapping method and a computer system using the same, and more particularly to a computerized data equidistant-mapping method incorporating the artificial neural network (ANN) and a computer system using the same.

2. Description of the Related Art

During the process of data processing, many data are non-linear data such as the data of molecular structure in the industries of biomedical pharmaceutics and chemistry, the data of life science engineering, the data of pattern recognition, the data of machine learning, and the data of computer visual image. During the process of data pairing analysis, the non-linear data are not easy to be paired for analysis, and must be transformed into linear data first.

The computerized data equidistant-mapping method is a popular method used in transforming non-linear data into linear data. Non-linear data already show linear distribution after equidistant mapping, and the similarity and dissimilarity between any two points can be obtained according to linear Euclidean space.

However, at least binominal time-space complexity is required in the algorithms of the equidistant mapping. When the volume of the data to be computed is huge, the computing time and storage space will increase dramatically. As a result, the time frame for the research and development is prolonged, and an enormous storage space is required.

SUMMARY OF THE INVENTION

The invention is directed to a computerized data equidistant-mapping method and a computer system using the same adopts the learning method of the artificial neural network in computing. The computer system comprises electronic devices used for generating the M sets of D-dimensional mapping data, and used for computing each mapping distance. According as each mapping data is amended according to each mapping distance and each original distance for enabling each mapping data and each original data to have equidistant-mapping relationship gradually.

According to a first aspect of the present invention, a computerized data equidistant-mapping method is provided. The computerized data equidistant-mapping method is used for mapping M sets of K-dimensional original data into a D-dimensional space in a manner of equidistance. The computerized data equidistant-mapping method includes the following steps. M sets of D-dimensional mapping data each corresponding to each original data respectively and sequentially are generated. An initial mapping data and an initial original data are chosen arbitrarily, wherein the initial mapping data corresponds to the initial original data. The mapping distance between each mapping data and the initial mapping data is computed. The original distance between each original data and the initial original data is computed. Each mapping data is amended according to each mapping distance and each original distance for enabling each mapping data and each original data to have equidistant-mapping relationship gradually.

According to a second aspect of the present invention, a computer system used for mapping M sets of K-dimensional original data into a D-dimensional space in a manner of equidistance is provided. The computer system includes a first electronic device and a plurality of second electronic devices. The first electronic device is used for generating M sets of D-dimensional mapping data each corresponding to each original data respectively and sequentially, and for arbitrarily choosing an initial mapping data and an initial original data from the mapping data and the original data, wherein the initial mapping data corresponds to the initial original data. The second electronic devices are used for respectively computing the mapping distance between each mapping data and the initial mapping data and for respectively computing the original distance between each original data and the initial original data, and for amending each mapping data according to each mapping distance and each original distance for enabling each mapping data and each original data to have equidistant-mapping relationship gradually.

The invention will become apparent from the following detailed description of the preferred but non-limiting embodiments. The following description is made with reference to the accompanying drawings.

DETAILED DESCRIPTION OF THE INVENTION

First Embodiment

Figure 1:
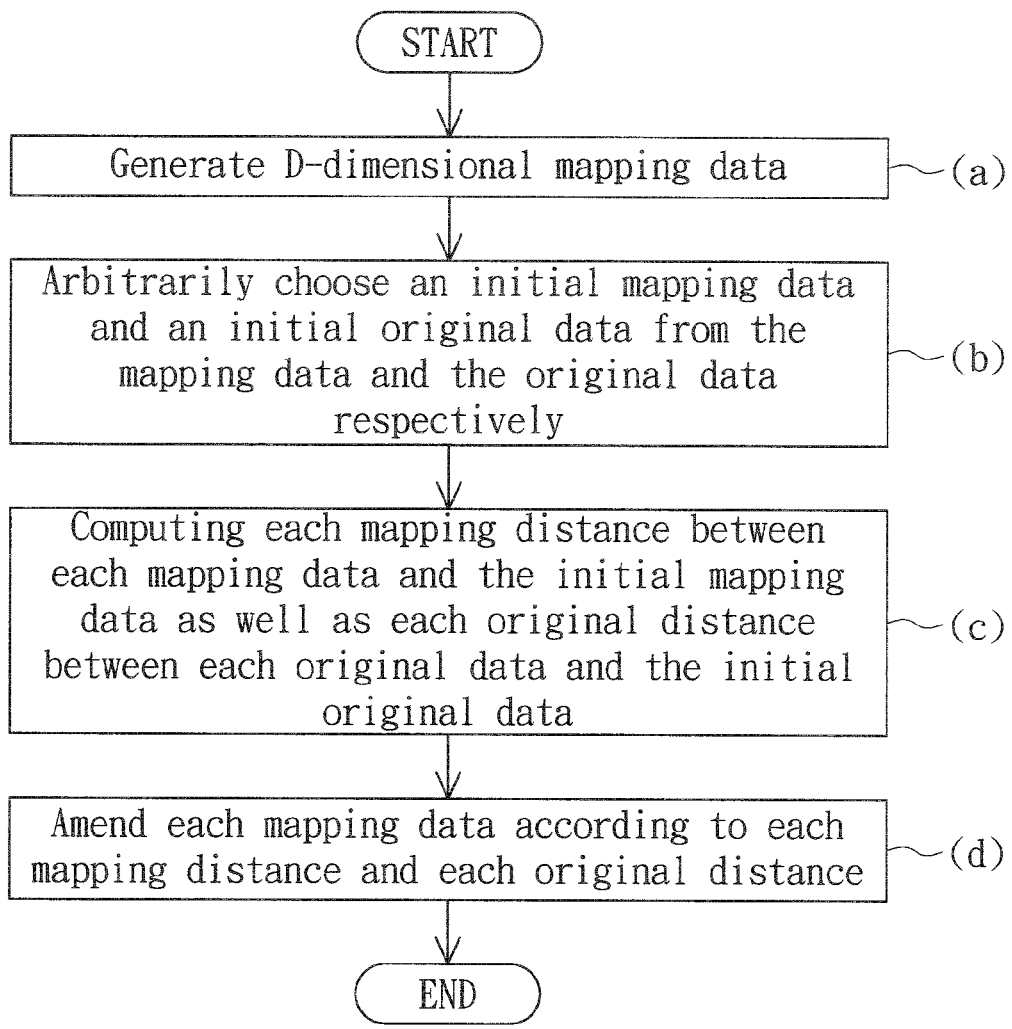
FIG. 1 is a flowchart of a computerized data equidistant-mapping method according to a first embodiment of the invention.

Referring to FIG. 1, a flowchart of a computerized data equidistant-mapping method according to a first embodiment of the invention is shown. The computerized data equidistant-mapping method is used for mapping M sets of K-dimensional original data into a D-dimensional space in a manner of equidistance. The computerized data equidistant-mapping method can be performed by an electronic device or distributed to several electronic devices. In the present embodiment of the invention, the computerized data equidistant-mapping method uses only one electronic device. The computerized data equidistant-mapping method of the present embodiment of the invention adopts the repeated learning method of the artificial neural network in computing. The main steps of the computerized data equidistant-mapping method are disclosed below in steps (a)~(d) with accompanied drawings.

Referring to both FIG. 1 and FIGS. 2A~2D. FIG. 2A~2D are diagrams illustrating each step of FIG. 1. Firstly, referring to FIG. 2A. In step (a), M sets of D-dimensional mapping data $P_j$, j=1, 2, 3, . . . , M are generated, wherein each mapping data $P_j$, j=1, 2, 3, . . . , M corresponds to each original data $V_j$, j=1, 2, 3, . . . , M respectively and sequentially. There is no equidistant-mapping relationship between the generated M sets of D-dimensional mapping data $P_j$, j=1, 2, 3, ..., M and the M sets of K-dimensional original data $V_j$, j=1, 2, 3, ..., M.

Despite equidistant-mapping relationship may not exist between the generated M sets of mapping data $P_j$, j=1, 2, 3, ..., M and the M sets of original data $V_j$, j=1, 2, 3, ..., M, the M sets of 12-dimensional mapping data $P_j$, j=1, 2, 3, ..., M and the M sets of K-dimensional original data $V_j$, j=1, 2, 3, ..., M are enabled to have equidistant-mapping relationship gradually through the amending procedure of repeated learning stated in steps (b)~(d) below.

Figure 2A:
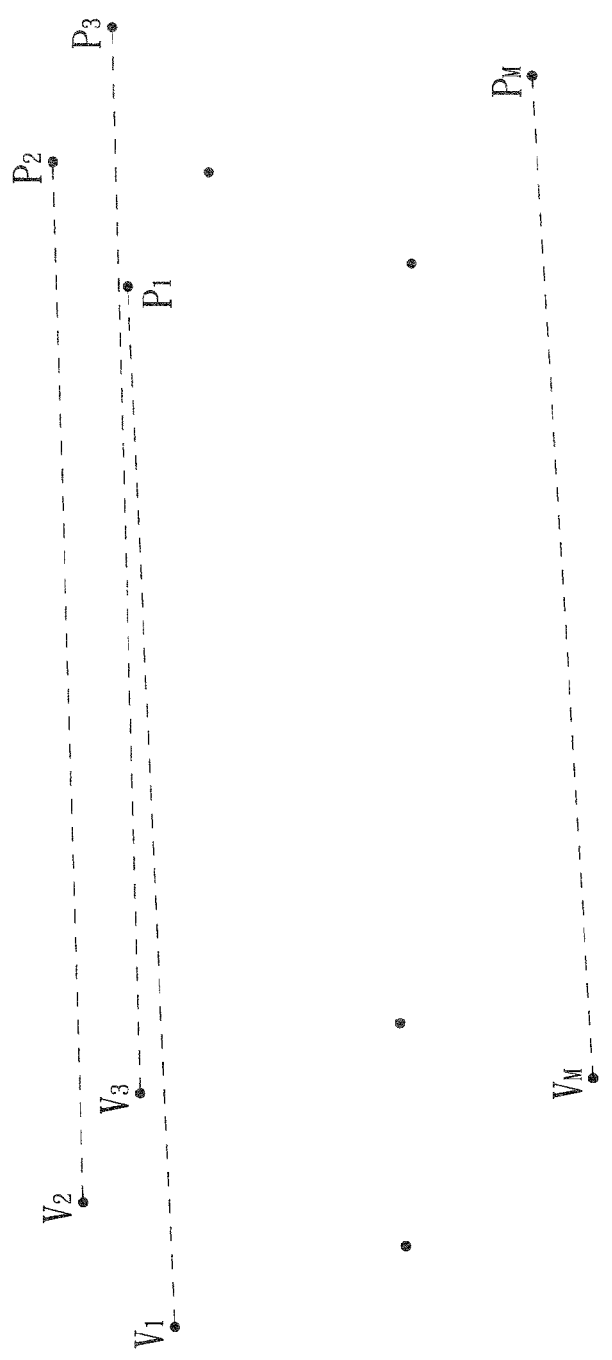
FIGS. 2A~2D are diagrams illustrating each step of FIG. 1.
Figure 2B:
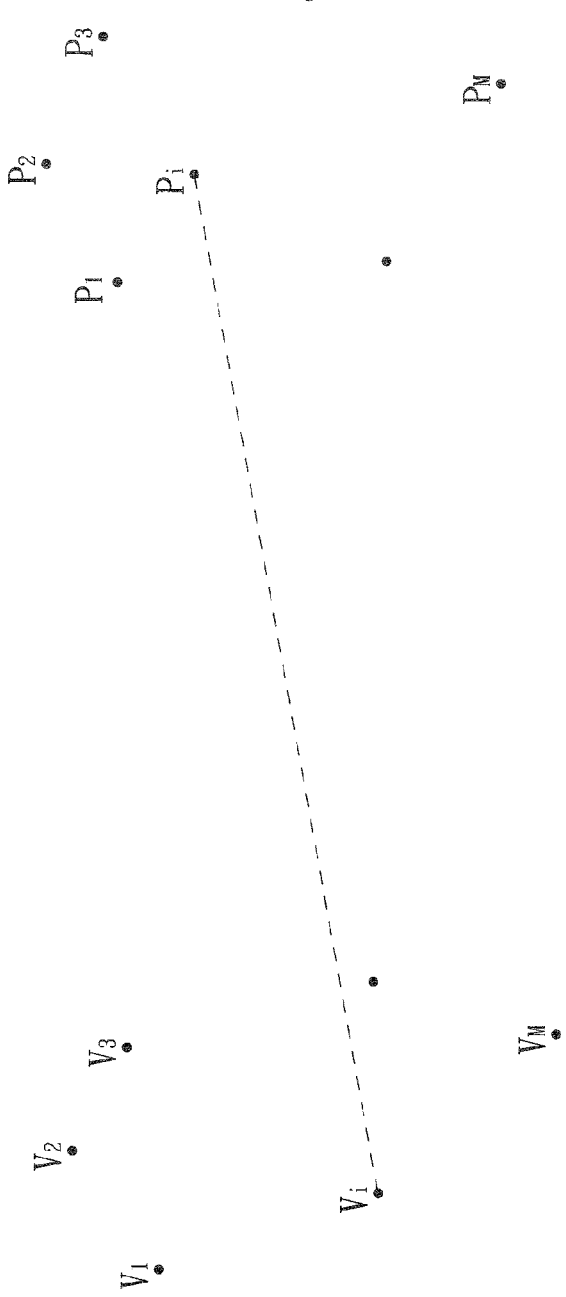

Next, referring to FIG. 2B. In step (b), an initial mapping data $P_i$, $1 \leq i \leq M$ and an initial original data $V_i$, $1 \leq i \leq M$ are arbitrarily chosen from the mapping data $P_j$, j=1, 2, 3, ..., M and the original data $V_j$, j=1, 2, 3, ..., M respectively, wherein the initial mapping data $P_i$, $1 \leq i \leq M$ corresponds to the initial original data $V_i$, $1 \leq i \leq M$. As the M sets of D-dimensional mapping data $P_j$, j=1, 2, 3, ..., M are generated arbitrarily the chosen initial mapping data $P_i$, $1 \leq i \leq M$ and the chosen initial original data $V_i$, $1 \leq i \leq M$ may not have equidistant-mapping relationship.

Figure 2C:
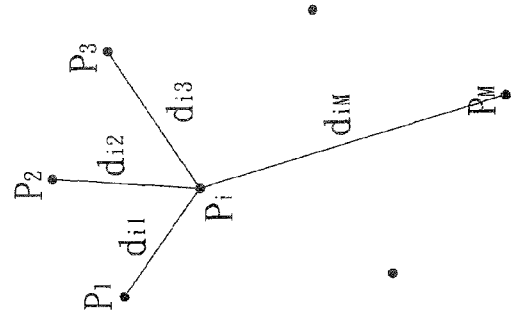
Figure 2C:
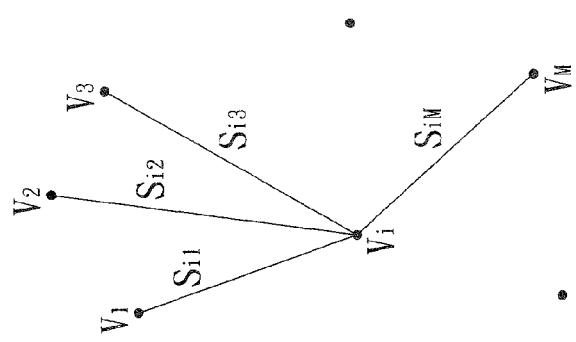

Then, referring to FIG. 2C. In step (c), each mapping distance $d_{ij}$, $1 \leq i \leq M$, j=1, 2, 3, ..., M between each mapping data $P_j$, j=1, 2, 3, ..., M and the initial mapping data $P_i$ is computed, and so is each original distance $s_{ij}$, $1 \leq i \leq M$, j=1, 2, 3, ..., M between each original data $V_j$, j=1, 2, 3, ..., M and the initial original data $V_i$ computed.

Figure 2D:
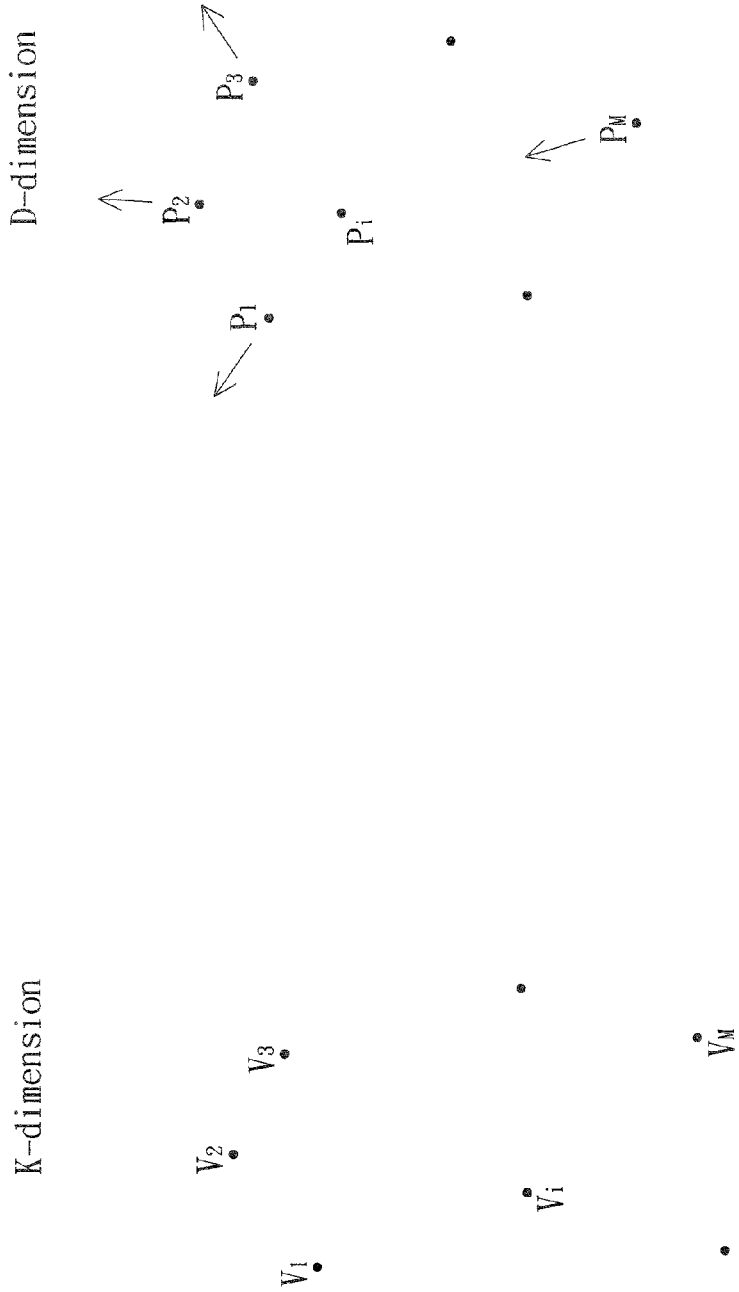

Next, referring to FIG. 2D. In step (d), each mapping data $P_i$, $1 \leq i \leq M$ is amended according to each mapping distance $d_{ij}$, $1 \leq i \leq M$, j=1, 2, 3, ..., M and each original distance $s_{ij}$, $1 \leq i \leq M$, j=1, 2, 3, ..., M for enabling each mapping data $P_i$, $1 \leq i \leq M$ and each original data $V_j$, j=1, 2, 3, ..., M to have equidistant-mapping relationship gradually.

Wherein the amending in step (d) can be designed according to the needs of the users. The main spirit of the computing in step (d) is stated below.

When the mapping distance $d_{ij}$ is larger than the original distance $s_{ij}$, the mapping data $P_j$ is amended in a direction towards the initial mapping data $P_i$ such as the mapping data $P_M$ of FIG. 2D;

When the mapping distance $d_{ij}$ is smaller than original distance $s_{ij}$, the mapping data $P_j$ is amended in a direction away from initial mapping data $P_i$ such as the mapping data $P_1$, the mapping data $P_2$ and the mapping data $P_3$ of FIG. 2D; and When the mapping distance $d_{ij}$ is equal to original distance $s_{ij}$, the mapping data $P_j$ is not amended.

Through the amending procedure of repeated learning stated in steps (b)~(d) disclosed above, the M sets of D-dimensional mapping data $P_j$, j=1, 2, 3, ..., M and the M sets of K-dimensional original data $V_j$, j=1, 2, 3, ..., M are enabled to have equidistant-mapping relationship gradually. Normally, the more learning count (the number of repeated computing) there are, the closer the equidistant-mapping relationship between the M sets of mapping data $P_j$, j=1, 2, 3, ..., M and the M sets of original data $V_j$, j=1, 2, 3, ..., M will be. The user can choose the number of repeated computing according to actual needs.

In the present embodiment of the invention, the above step (d) is further amended according to a neighboring fuzzy membership function expressed in formulas (1) and an amending formulas expressed in formulas (2):

$$m(s_{ij}, d_{ij}, \sigma) = \frac{1}{1 + \left| \frac{d_{ij}}{\sigma} \left(1 + \left|\frac{d_{ij}}{s_{ij} + 0.1^{10}}\right|^{10^{10}}\right) \right|^{10^{10}}} \quad (1)$$

$$P_j = P_j + L \cdot m(s_{ij}, d_{ij}, \sigma) \cdot \frac{d_{ij} - s_{ij}}{d_{ij} + 0.1^{10}} \cdot (P_i - P_j) \quad (2)$$

wherein $m(s_{ij}, d_{ij}, \sigma)$ is the neighboring fuzzy membership function, L is a learning rate, $\sigma$ is the neighboring fuzzy membership side influence. As for how the computerized data equidistant-mapping method of the present embodiment of the invention performs computing according to the neighboring fuzzy membership function (1) and the amending formulas (2) is elaborated below in greater details.

Figure 3A:
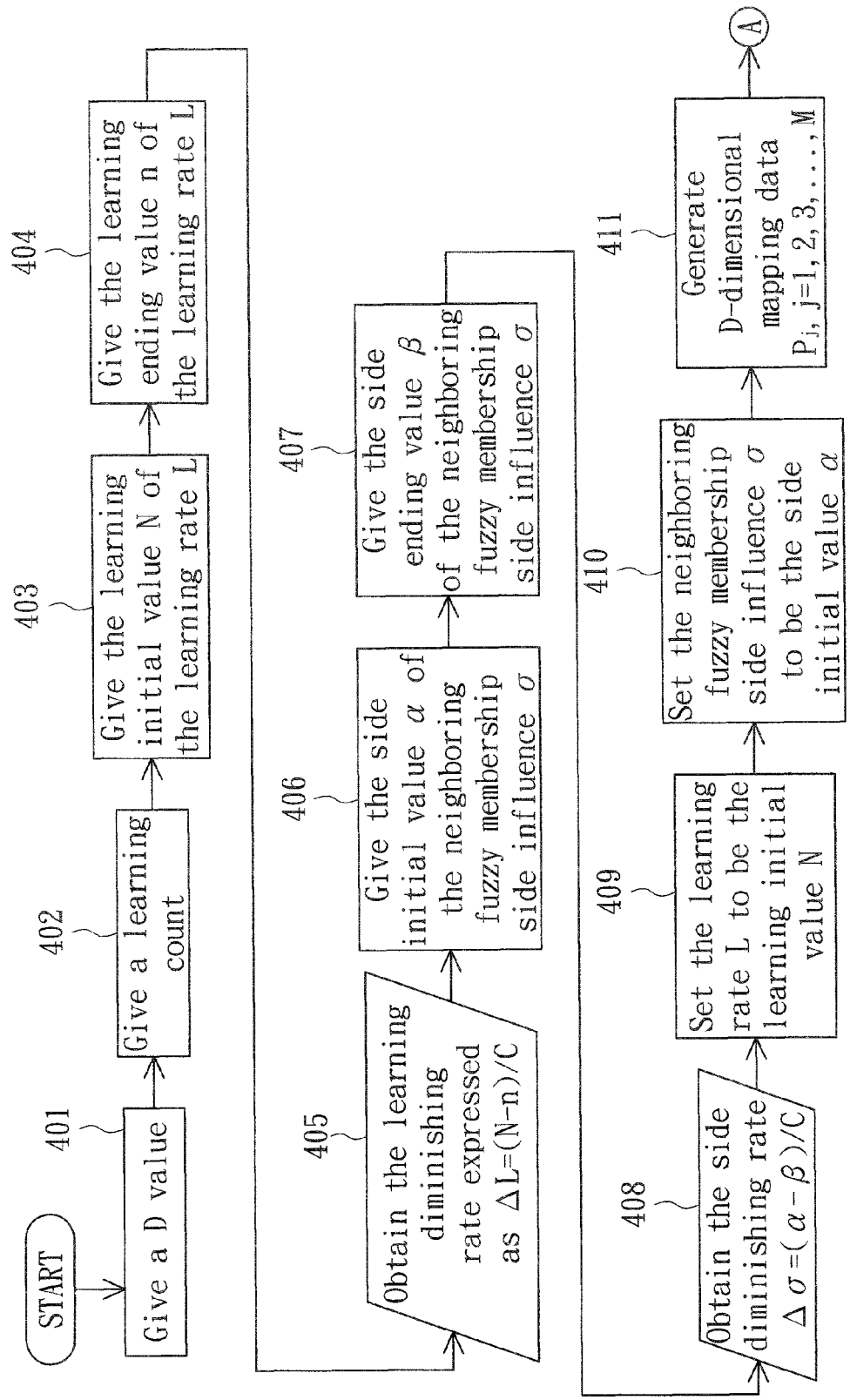
FIGS. 3A~3B are detailed flowcharts of the computerized data equidistant-mapping method according to the first embodiment of the invention.
Figure 3B:
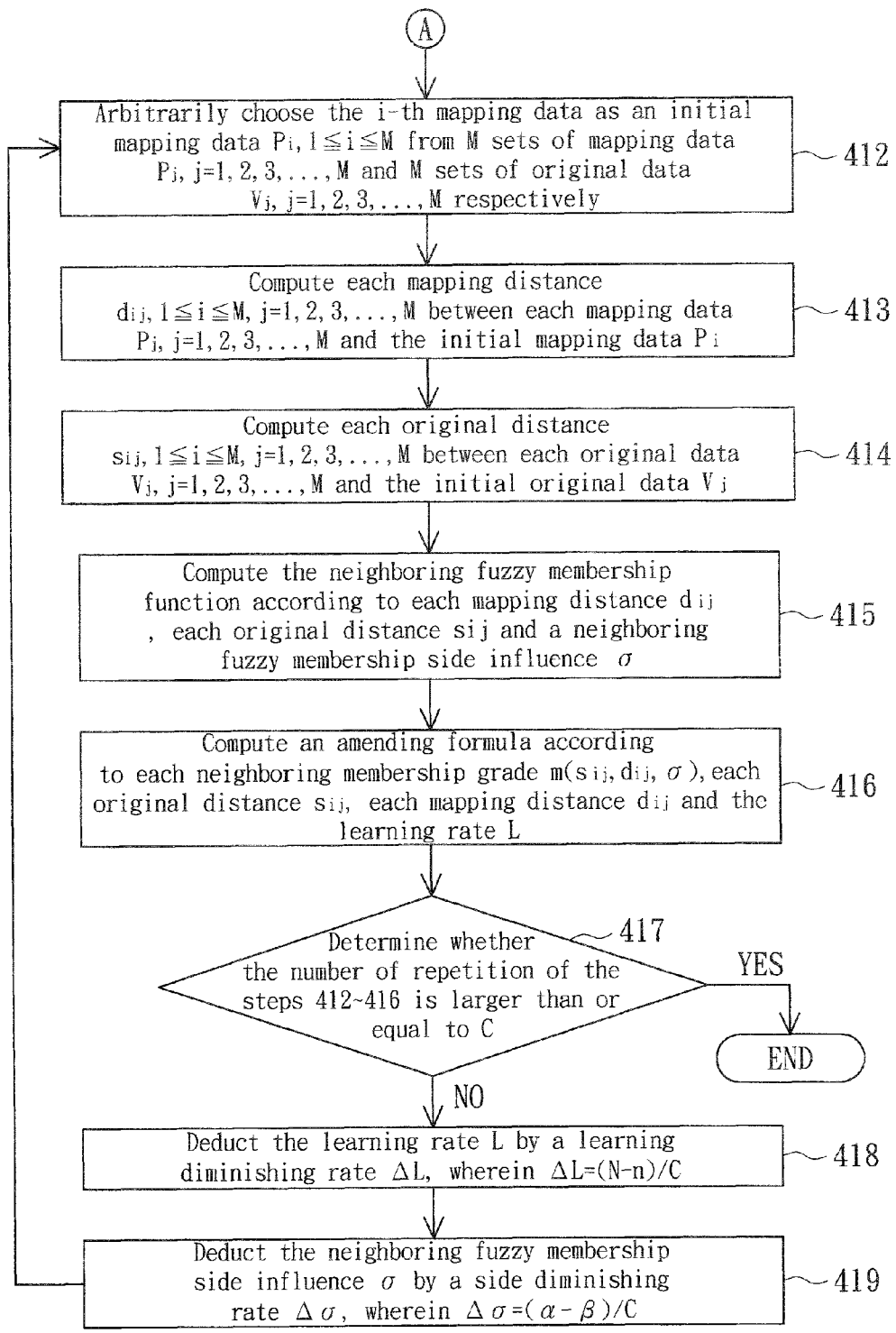

Referring to FIG. 3A~3B, detailed flowcharts of the computerized data equidistant-mapping method according to the first embodiment of the invention are shown. Firstly, in step 401, a D value is given. M sets of K-dimensional original data $V_j$, j=1, 2, 3, ..., M are mapped into M sets of D-dimensional mapping data $P_j$, j=1, 2, 3, ..., M in a manner of equidistance.

Wherein D is smaller than or equal to K, and K, M and D are positive integers. Normally, D value is given as 2. That is, when the M sets of K-dimensional original data $V_j$, j=1, 2, 3, ..., M are mapped in a manner of equidistance, M sets of two-dimensional mapping data $P_j$, j=1, 2, 3, ..., M are generated. The two-dimensional mapping data $P_j$, j=1, 2, 3, ..., M are very convenient during the process of data pairing analysis.

Next, in step 402, a learning count C (the number of repeated computing) is given, wherein C is a positive integer.

Then, in steps 403~405, both the learning initial value N and the learning ending value n of the learning rate L are given, and a learning-diminishing rate is obtained according to the learning initial value N, the learning ending value n and the learning count C, wherein the learning-diminishing rate is expressed as $$\Delta L = \frac{N - n}{C},$$

$0 < N \leq 1$, $0 < n \leq 1$, $n < N$. During the process of repeated computing, the learning rate L gradually diminishes to the learning ending value n from the learning initial value N. During each repetition of computing, the learning rate L diminishes at a learning-diminishing rate $\Delta L$ until the learning rate L diminishes to the learning ending valued.

Next, in steps 406~408, both the side initial value $\alpha$ and the side ending value $\beta$ of the neighboring fuzzy membership side influence $\sigma$ are given, and a side diminishing rate $$\Delta \sigma = \frac{\alpha - \beta}{C}$$

is obtained according to the side initial value $\alpha$, the side ending value $\beta$ and the learning count C, wherein $0 \leq \beta$, $\beta < \alpha$. During the process of repeated computing, the neighboring fuzzy membership side influence $\sigma$ gradually diminishes to the side ending value $\beta$ from the side initial value $\alpha$. During each repetition of computing, the neighboring fuzzy membership side influence $\sigma$ gradually diminishes at a side-diminishing rate Δσ until the neighboring fuzzy membership side influence σ diminishes to the learning ending value β.

Despite steps 403~408 are exemplified according to the step order illustrated in FIG. 3A~3B, the step order of steps 403~408 is not limited thereto. For example, step 404 may come before or synchronizes with step 403; step 407 may come before or synchronizes with step 406; steps 406~408 may come before steps 403~405 or synchronize with steps 403~408.

Then, in steps 409~410, the learning rate L is set to be the learning initial value N, and the neighboring fuzzy membership side influence σ is set to be the side initial value α.

Despite steps 409~410 are exemplified by the step order illustrated in FIG. 3A~3B, however the step order of steps 409~410 is not limited thereto. For example, step 409 may come before or synchronize with step 410.

Next, in step 411, M sets of D-dimensional mapping data $P_j$, j=1, 2, 3, . . . , M are generated, wherein each mapping data $P_j$, j=1, 2, 3, . . . , M corresponds to each original data $V_j$, j=1, 2, 3, . . . , M respectively and sequentially. That is, $P_1$ corresponds to $V_1$, $P_2$ corresponds to $V_2$, $P_3$ corresponds to $V_3$, and so on. By the same token, $P_M$ corresponds to $V_M$.

Then, in step 412, the $i^{-th}$ mapping data is arbitrarily chosen as an initial mapping data $P_i$, $1 \leq i \leq M$ from M sets of mapping data $P_j$, j=1, 2, 3, . . . , M and M sets of original data $V_j$, j=1, 2, 3, . . . , M respectively. The corresponding $i^{-th}$ original data is the initial original data $V_i$, $1 \leq i \leq M$.

Next, in steps 413~414, each mapping distance $d_{ij}$, $1 \leq i \leq M$, j=1, 2, 3, . . . , M between each mapping data $P_j$, j=1, 2, 3, . . . , M and the initial mapping data $P_i$ is computed, and so is each original distance $s_{ij}$, $1 \leq i \leq M$, j=1, 2, 3, . . . , M between each original data $V_j$, j=1, 2, 3, . . . , M and the initial original data $V_i$ computed, wherein each mapping data $P_j$ includes D parameters $p_{j1}, p_{j2}, p_{j3}, \ldots, p_{jD}$, and the initial mapping data $P_i$ includes D parameters $p_{i1}, p_{i2}, p_{i3}, \ldots, p_{iD}$.

In step 413, the mapping distance $d_{ij}$ is expressed as:

$$d_{ij} = \sqrt{(p_{j1} - p_{i1})^2 + (p_{j2} - p_{i2})^2 + (p_{j3} - p_{i3})^2 + \ldots + (p_{jD} - p_{iD})^2},$$

$$1 \leq i \leq M, j = 1, 2, 3, \ldots, M$$

Besides, each original data $v_j$ includes K parameters $v_{j1}, v_{j2}, v_{j3}, \ldots, v_{jK}$, the initial original data $v_i$ includes K parameters $v_{i1}, v_{i2}, v_{i3}, \ldots, v_{iK}$. In step 414, the original distance $s_{ij}$ is expressed as:

$$s_{ij} = \sqrt{(v_{j1} - v_{i1})^2 + (v_{j2} - v_{i2})^2 + (v_{j3} - v_{i3})^2 + \ldots + (v_{jK} - v_{iK})^2},$$

$$1 \leq i \leq M, j = 1, 2, 3, \ldots, M.$$

Then, in steps 415~416, each mapping data $P_j$ is amended according to each mapping distance $d_{ij}$ and each original distance $s_{ij}$ for enabling each mapping data $P_j$ and each original data $v_{ij}$ to have equidistant-mapping relationship gradually.

In step 415, the neighboring fuzzy membership function $$m(s_{ij}, d_{ij}, \sigma) = \frac{1}{1 + \left| \frac{d_{ij}}{\left(1 + \left| \frac{d_{ij}}{s_{ij} + 0.1^{10}} \right|^{10^{10}} \right)} \right|^{10^{10}}}$$

is computed according to each mapping distance $d_{ij}$, each original distance $s_{ij}$ and a neighboring fuzzy membership side influence σ for obtaining each neighboring membership grade $m(s_{ij}, d_{ij}, \sigma)$.

Besides, in step 416, an amending formula $$P_j = P_j + L \cdot m(s_{ij}, d_{ij}, \sigma) \cdot \frac{d_{ij} - s_{ij}}{d_{ij} + 0.1^{10}} \cdot (P_i - P_j)$$

is computed according to each neighboring membership grade $m(s_{ij}, d_{ij}, \sigma)$ each original distance $s_{ij}$, each mapping distance $d_{ij}$ and the learning rate L for enabling each mapping data $P_j$, j=1, 2, 3, . . . , M and each original data $V_j$, j=1, 2, 3, . . . , M to have equidistant-mapping relationship gradually.

For example, several kinds of relationships between each mapping distance $d_{ij}$ and corresponding each original distance $s_{ij}$ shown in the amending formulas are stated below.

If the mapping distance $d_{ij}$ is larger than the original distance $s_{ij}$ and the $j^{-th}$ mapping data $P_j$ is larger than initial mapping data $P_i$, then the value of $d_{ij}-s_{ij}$ is positive but $(P_i-P_j)$ is negative. After the computing of the amending formulas, the $j^{-th}$ mapping data $P_j$ will be decreased and amended in a direction towards the initial mapping data $P_i$;

If the mapping distance $d_{ij}$ is larger than the original distance $s_{ij}$ and the $j^{-th}$ mapping data $P_j$ is smaller than the initial mapping data $P_i$, then the value of $d_{ij}-s_{ij}$ is positive and so is $(P_i-P_j)$ positive. After the computing of the amending formulas, the $j^{-th}$ mapping data $P_j$ will be increased and amended in a direction towards the initial mapping data $P_i$;

If the mapping distance $d_{ij}$ is smaller than the original distance $s_{ij}$ and the $j^{-th}$ mapping data $P_j$ is larger than the initial mapping data $P_i$, then the value of $d_{ij}-s_{ij}$ is negative and so is $(P_i-P_j)$ negative. After the computing of the amending formulas, the $j^{-th}$ mapping data $P_j$ will be increased and amended in a direction away from the initial mapping data $P_i$;

If the mapping distance $d_{ij}$ is smaller than original distance $s_{ij}$ and the $j^{-th}$ mapping data $P_j$ is smaller than the initial mapping data $P_i$, then the value of $d_{ij}-s_{ij}$ is negative but $(P_i-P_j)$ is positive. After the computing of the amending formulas, the $j^{-th}$ mapping data $P_j$ will be decreased and amended in a direction away from initial mapping data $P_i$;

If the mapping distance $d_{ij}$ is equal to the original distance $s_{ij}$, then the value of $d_{ij}-s_{ij}$ is 0. After the computing of the amending formulas, the $j^{-th}$ mapping data $P_j$ will not be amended.

Next, in step 417, whether the number of repetition of the steps 412~416 is larger than or equal to C is determined. If not, steps 418~419 are performed again; if so, the present process of terminated.

In step 418, the learning rate L is deducted by a learning-diminishing rate ΔL, wherein $$\Delta L = \frac{N-n}{C}.$$

In step 419, the neighboring fuzzy membership side influence σ is deducted by the side-diminishing rate Δσ, wherein $$\Delta \sigma = \frac{\alpha - \beta}{C}.$$

Then, steps 412~416 are repeated for enabling each mapping data $P_j$ and each original data $s_j$ to have equidistant-mapping relationship gradually. That is, in every new amending process, a new initial mapping data $P_i$ and new initial original data $s_i$ are chosen, and the mapping distance $d_{ij}$ and the original distance $s_{ij}$ are computed again. Then, each mapping data $P_j$ is amended again. After each amending, each mapping data $P_j$ and each original data $s_j$ will have equidistant-mapping relationship gradually.

The computerized data equidistant-mapping method of the present embodiment of the invention combines the self-organizing system of non-monitoring learning method of artificial neural network, so that the binominal complexity of time is reduced into the linear time complexity and the binominal complexity of space is reduced into the constant time complexity.

Second Embodiment

The computerized data equidistant-mapping method of the present embodiment of the invention differs with the computerized data equidistant-mapping method of the first embodiment in that the computerized data equidistant-mapping method of the present embodiment of the invention is used in a computer system composed of several electronic devices, and the similarities are not repeated here.

Figure 4:
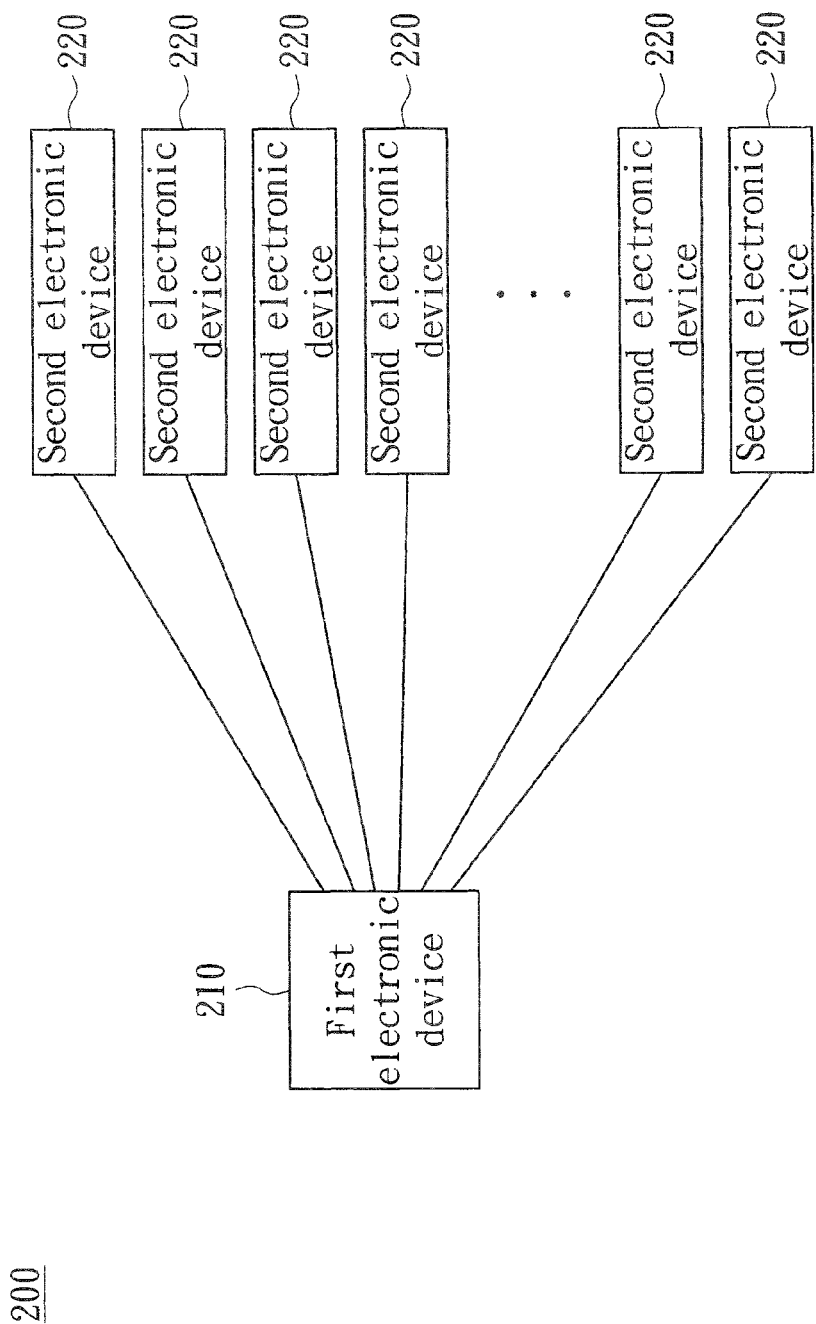
FIG. 4 is a perspective of a computer system using the computerized data equidistant-mapping method according to a second embodiment of the invention.

Referring to FIG. 4, a perspective of a computer system using the computerized data equidistant-mapping method according to a second embodiment of the invention is shown. The computer system 200 is used for mapping M sets of K-dimensional original data into a D-dimensional space in a manner of equidistance. The computer system 200 includes a first electronic device 210 and several second electronic devices 220. The first electronic device 210 is used for performing the above steps 401~412 and steps 417~419. Each second electronic device 220 is used for performing the above steps 413~416. That is, the computing of the amending formulas of M sets of mapping distance $d_{ij}$, M sets of original distance $s_{ij}$, M sets of neighboring fuzzy membership function $m(s_{ij}, d_{ij}, \sigma)$ and M sets of mapping data $P_j$ is distributed to several second electronic devices 220. After the computing of each data is distributed to several second electronic devices 220 in parallel, the computing speed is largely increased and the system load is largely reduced.

The number of the second electronic device 220 is determined according to the cost/efficiency consideration of the user, but the number of the second electronic device 220 is not for limiting the scope of protection of the invention.

The computerized data equidistant-mapping method and the computer system using the same disclosed in the above embodiments of the invention combines the learning method of artificial neural network in computing, its characteristics stated below.

The computerized data equidistant-mapping method combines the self-organizing system of non-monitoring learning method of artificial neural network, so that the binominal time complexity is reduced into the linear time complexity and the binominal space complexity is reduced into the constant time complexity.

The computerized data equidistant-mapping method is distributed to several second electronic devices in parallel, the computing speed is largely increased and the system load is reduced The computerized data equidistant-mapping method and the computer system using the same is a pre-processing technology of pattern recognizing, machine-learning and computer visual image and is applicable to related industries of pattern recognition, machine-learning and computer visual image such as machine-human visual learning and photo-recognition for security camera monitoring.

The computerized data equidistant-mapping method and the computer system using the same is applicable to the industries of digital contents. The computerized data equidistant-mapping method of the invention is applicable to the non-linear making of the digital contents such as analysis, synthesis, retrieving, generation, editing and sharing.

The computerized data equidistant-mapping method and the computer system using the same is applicable to the industries of biomedicine and chemistry. The computerized data equidistant-mapping method of the invention is an essential technology to the analysis of physical and chemical properties in the industries of biomedical pharmaceutics and chemistry such as the categorization of molecular similarity and molecular dissimilarity.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computerized data equidistant-mapping method used by a computer system for mapping M sets of K-dimensional original data into a D-dimensional space in a manner of equidistance, the computerized data equidistant-mapping method comprising:
   (a) generating the M sets of D-dimensional mapping data by the computer system, wherein each mapping data corresponds to each original data respectively and sequentially;
   (b) arbitrarily choosing an initial mapping data and an initial original data by the computer system from the mapping data and the original data respectively, wherein the initial mapping data corresponds to the initial original data;
   (c) computing each mapping distance between each mapping data and the initial mapping data, and computing each original distance between each original data and the initial original data by the computer system; and
   (d) amending each mapping data according to each mapping distance and each original distance by the computer system for enabling each mapping data and each original data to have equidistant-mapping relationship gradually;

wherein the step (d) comprises:
- (d11) amending the mapping data in a direction towards the initial mapping data when the mapping distance is larger than the original distance;
- (d12) amending the mapping data in a direction away from the initial mapping data when the mapping distance is smaller than the original distance; and
- (d13) not amending the mapping data when the mapping data is equal to the original data.

2. The computerized data equidistant-mapping method according to claim 1, following the step (d), the computerized data equidistant-mapping method further comprises:
- (g) repeating the step (c) and the step (d) for enabling each mapping data and each original data to have equidistant-mapping relationship gradually.

3. The computerized data equidistant-mapping method according to claim 1, wherein in the step (c), the computing of each mapping distance is distributed to a plurality of electronic devices.

4. The computerized data equidistant-mapping method according to claim 1, wherein in the step (c), the computing of each original distance is distributed to a plurality of electronic devices.

5. The computerized data equidistant-mapping method according to claim 1, wherein in the step (d), the amending of each mapping data is distributed to a plurality of electronic devices.

6. The computerized data equidistant-mapping method according to claim 1, wherein
the M sets of original data are $V_j$, j=1, 2, 3, . . . , M,
the initial original data is $V_i$, $1 \leq i \leq M$,
the M sets of mapping data are $P_j$, j=1, 2, 3, . . . , M,
the initial mapping data is $P_i$, $1 \leq i \leq M$,
the original distances are $s_{ij}$, $1 \leq i \leq M$, j=1, 2, 3, . . . , M,
the mapping distances are $d_{ij}$, $1 \leq i \leq M$, j=1, 2, 3, . . . , M, the step (d) comprises:
- (d21) computing a neighboring fuzzy membership function $$m(s_{ij}, d_{ij}, \sigma) = \frac{1}{1 + \left| \frac{d_{ij}}{\sigma} \left(1 + \left| \frac{d_{ij}}{s_{ij} + 0.1^{10}} \right|^{10^{10}} \right) \right|^{10^{10}}}$$

according to each mapping distance $d_{ij}$, $1 \leq i \leq M$, j=1, 2, 3, . . . , M, each original distance $s_{ij}$, $1 \leq i \leq M$, j=1, 2, 3, . . . , M and a neighboring fuzzy membership side influence $\sigma$ for obtaining each neighboring membership grade $m(s_{ij}, d_{ij}, \sigma)$; and
- (d22) computing an amending formulas $$P_j = P_j + L \cdot m(s_{ij}, d_{ij}, \sigma) \cdot \frac{d_{ij} - s_{ij}}{d_{ij} + 0.1^{10}} \cdot (P_i - P_j)$$

according to each neighboring membership grade $m(s_{ij}, d_{ij}, \sigma)$, each original distance $s_{ij}$, $1 \leq i \leq M$, j=1, 2, 3, . . . , M, each mapping distance $d_{ij}$, $1 \leq i \leq M$, j=1, 2, 3, . . . , M and a learning rate L, such that each mapping data $P_j$, j=1, 2, 3, . . . , M and each original data $V_j$, j=1, 2, 3, . . . , M have equidistant-mapping relationship gradually.

7. The computerized data equidistant-mapping method according to claim 6, wherein in the step (d21), the computing of the neighboring fuzzy membership function corresponding to each mapping data is distributed to a plurality of electronic devices.

8. The computerized data equidistant-mapping method according to claim 6, wherein in the step (d22), the computing of the amending formulas corresponding to each mapping data is distributed to a plurality of electronic devices.

9. The computerized data equidistant-mapping method according to claim 6, wherein the learning rate L diminishes to a learning ending value n from a learning initial value N, the neighboring fuzzy membership side influence $\sigma$ diminishes to a side ending value $\beta$ from a side initial value $\alpha$, and following the step (d), the computerized data equidistant-mapping method further comprises:
- (g) repeating the step (c) and the step (d);
- (e) determining whether the repetition of the step (c) and the step (d) is larger than or equal to C: if not, step (f) is performed; and
- (f) deducting the learning rate L by a learning-diminishing rate $\Delta L$, wherein $$\Delta L = \frac{N - n}{C},$$

and deducting the neighboring fuzzy membership side influence $\sigma$ by a side diminishing rate $\Delta \sigma$, wherein $$\Delta \sigma = \frac{\alpha - \beta}{C}.$$

10. The computerized data equidistant-mapping method according to claim 1, wherein
the M sets of original data are $V_j$, j=1, 2, 3, . . . , M,
each original data comprises K parameters $v_{j1}$, $v_{j2}$, $v_{j3}$, . . . , $v_{jK}$,
the initial original data is $V_i$, $1 \leq i \leq M$,
the initial original data comprises K parameters $v_{i1}$, $v_{i2}$, $v_{i3}$, . . . , $v_{iK}$,
the M sets of mapping data are $P_j$, j=1, 2, 3, . . . , M,
each mapping data comprises D parameters $p_{j1}$, $p_{j2}$, $p_{j3}$, . . . , $p_{jD}$,
the initial mapping data is $P_i$, $1 \leq i \leq M$,
the initial mapping data comprises D parameters $p_{i1}$, $p_{i2}$, $p_{i3}$, . . . , $p_{iD}$, wherein in the step (c), the original distances are expressed as $$s_{ij} = \sqrt{(v_{j1} - v_{i1})^2 + (v_{j2} - v_{i2})^2 + (v_{j3} - v_{i3})^2 + \ldots + (v_{jK} - v_{iK})^2},$$
$$1 \leq i \leq M, j = 1, 2, 3, \ldots, M,$$

the mapping distances are expressed as $$d_{ij} = \sqrt{(p_{j1} - p_{i1})^2 + (p_{j2} - p_{i2})^2 + (p_{j3} - p_{i3})^2 + \ldots + (p_{jD} - p_{iD})^2},$$
$$1 \leq i \leq M, j = 1, 2, 3, \ldots, M.$$

11. A computer system used for mapping M sets of K-dimensional original data into a D-dimensional space in a manner of equidistance, the computer system comprising:
a first electronic device used for generating the M sets of D-dimensional mapping data, wherein each mapping data corresponds to each original data respectively and sequentially, an initial mapping data and an initial original data are arbitrarily chosen from the mapping data and the original data respectively, the initial mapping data corresponds to the initial original data; and a plurality of second electronic devices used for computing each mapping distance between each mapping data and the initial mapping data respectively, computing each original distance between each original data and the initial original data respectively, and amending each mapping data according to each mapping distance and each original distance for enabling each mapping data and each original data to have equidistant-mapping relationship gradually;

wherein the corresponding second electronic device amends the mapping data in a direction towards the initial mapping data when the mapping distance is larger than the original distance;

the corresponding second electronic device amends the mapping data in a direction away from the initial mapping data when the mapping distance is smaller than the original distance; and the corresponding second electronic device does not amend the mapping data when the mapping data is equal to the original data.

12. The computer system according to claim 11, wherein the M sets of original data are $V_j$, j=1, 2, 3, . . . , M, the initial original data is $V_i$, $1 \leq i \leq M$, the M sets of mapping data are $P_j$, j=1, 2, 3, . . . , M, the initial mapping data is $P_i$, $1 \leq i \leq M$, the original distances are $s_{ij}$, $1 \leq i \leq M$, j=1, 2, 3, . . . , M, the mapping distances are $d_{ij}$, $1 \leq i \leq M$, j=1, 2, 3, . . . , M, each second electronic device is further used for computing a neighboring fuzzy membership function $$m(s_{ij}, d_{ij}, \sigma) = \frac{1}{1 + \left| \frac{\left(1 + \left| \frac{d_{ij}}{s_{ij} + 0.1^{10}} \right|^{10^{10}}\right)}{\sigma} \right|^{10^{10}}}$$

according to each corresponding mapping distance $d_{ij}$, $1 \leq i \leq M$, j=1, 2, 3, . . . , M, original distance $s_{ij}$, $1 \leq i \leq M$, j=1, 2, 3, . . . , M and a corresponding neighboring fuzzy membership side influence σ for obtaining each neighboring membership grade $m(s_{ij}, d_{ij}, \sigma)$, each second electronic device is further used for computing amending formulas $$P_j = P_j + L \cdot m(s_{ij}, d_{ij}, \sigma) \cdot \frac{d_{ij} - s_{ij}}{d_{ij} + 0.1^{10}} \cdot (P_i - P_j)$$

according to each corresponding neighboring membership grade $m(s_{ij}, d_{ij}, \sigma)$, original distance $s_{ij}$, $1 \leq i \leq M$, j=1, 2, 3, . . . , M, mapping distance $d_{ij}$, $1 \leq i \leq M$, j=1, 2, 3, . . . , M and a corresponding learning rate L for enabling each mapping data $P_j$, j=1, 2, 3, . . . , M and each original data $V_j$, j=1, 2, 3, . . . , M to have equidistant-mapping relationship gradually.

13. The computer system according to claim 12, wherein the learning rate L diminishes to a learning ending value n from a learning initial value N, the neighboring fuzzy membership side influence σ diminishes to a side ending value β from a side initial value α, each second electronic device, after having amended each mapping data $P_i$, $1 \leq i \leq M$, determines whether the times of computing each corresponding original distance $s_{ij}$, $1 \leq i \leq M$, j=1, 2, 3, . . . , M, mapping distance $d_{ij}$, $1 \leq i \leq M$, j=1, 2, 3, . . . , M and mapping data $P_i$, $1 \leq i \leq M$ is larger than or equal to C: if not, each second electronic device further deducts the learning rate L by a learning-diminishing rate ΔL, wherein $$\Delta L = \frac{N - n}{C},$$

and deducts the neighboring fuzzy membership side influence σ by a side diminishing rate Δσ, wherein $$\Delta \sigma = \frac{\alpha - \beta}{C},$$

and repeats the computing of each original distance $s_{ij}$, $1 \leq i \leq M$, j=1, 2, 3, . . . , M, each mapping distance $d_{ij}$, $1 \leq i \leq M$, j=1, 2, 3, . . . , M and each mapping data $P_i$, $1 \leq i \leq M$.

14. The computer system according to claim 11, wherein the M sets of original data are $V_j$, j=1, 2, 3, . . . , M, each original data comprises K parameters $v_{j1}$, $v_{j2}$, $v_{j3}$, . . . , $v_{jK}$, the initial original data is $V_i$, $1 \leq i \leq M$,
the initial original data comprises K parameters $v_{i1}$, $v_{i2}$, $v_{i3}$, . . . , $v_{iK}$,
the M sets of mapping data are $P_j$, j=1, 2, 3, . . . , M,
each mapping data comprises D parameters $p_{j1}$, $p_{j2}$, $p_{j3}$, . . . , $p_{jD}$,
the initial mapping data is $P_i$, $1 \leq i \leq M$,
the initial mapping data comprises D parameters $p_{i1}$, $p_{i2}$, $p_{i3}$, . . . , $p_{iD}$,
each second electronic device computes each corresponding original distance according to the formulas $$s_{ij} = \sqrt{(v_{j1} - v_{i1})^2 + (v_{j2} - v_{i2})^2 + (v_{j3} - v_{i3})^2 + \ldots + (v_{jK} - v_{iK})^2},$$

$$1 \leq i \leq M, j = 1, 2, 3, \ldots, M,$$

each second electronic device computes each corresponding mapping distance according to the formulas $$d_{ij} = \sqrt{(p_{j1} - p_{i1})^2 + (p_{j2} - p_{i2})^2 + (p_{j3} - p_{i3})^2 + \ldots + (p_{jD} - p_{iD})^2},$$

$$1 \leq i \leq M, j = 1, 2, 3, \ldots, M.$$

* * * * *